US006320952B1

(12) United States Patent
Bruno et al.

(10) Patent No.: US 6,320,952 B1
(45) Date of Patent: Nov. 20, 2001

(54) METHOD AND SYSTEM FOR TRANSFERRING DIGITAL DATA CALLS BETWEEN DIFFERENT DESTINATIONS

(75) Inventors: Richard Frank Bruno, Morristown; Howard Paul Katseff, Englishtown; Bethany Scott Robinson, Lebanon; Robert Edward Markowitz, Glen Rock, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/070,143

(22) Filed: Apr. 30, 1998

(51) Int. Cl.⁷ .................................................... H04M 3/58
(52) U.S. Cl. ............................. 379/211.02; 379/212.01; 379/201.01; 705/26
(58) Field of Search ................................. 379/211, 212, 379/201, 91.01, 92.02; 705/26

(56) References Cited

U.S. PATENT DOCUMENTS

| | | | |
|---|---|---|---|
| 5,003,595 | 3/1991 | Collins et al. | 380/25 |
| 5,499,289 | 3/1996 | Bruno et al. | 379/220 |
| 5,533,108 | 7/1996 | Harris et al. | 379/201 |
| 5,557,667 | 9/1996 | Bruno et al. | 379/201 |
| 5,563,882 | 10/1996 | Bruno et al. | 370/62 |
| 5,563,937 | 10/1996 | Bruno et al. | 379/201 |
| 5,692,132 | * 11/1997 | Hogan | 395/227 |
| 5,724,355 | 3/1998 | Bruno et al. | 370/401 |
| 5,884,032 | * 3/1999 | Bateman et al. | 395/200.34 |
| 5,897,622 | * 4/1999 | Blinn et al. | 705/26 |
| 5,898,594 | * 4/1999 | Leason et al. | 705/26 |
| 5,940,807 | * 8/1999 | Purcell | 705/26 |
| 5,950,172 | * 9/1999 | Klingman | 379/201 |
| 5,970,473 | * 10/1999 | Gerszberg et al. | 705/26 |
| 6,070,798 | * 6/2000 | Nethery | 235/462.01 |
| 6,115,460 | * 9/2000 | Crowe et al. | 379/211 |
| 6,122,364 | * 9/2000 | Petrunka et al. | 379/265 |

OTHER PUBLICATIONS

Newton's Telecom Dictionary, Harry Newton p. 47, 1998.*

* cited by examiner

Primary Examiner—Ahmad Matar
Assistant Examiner—William J. Deane, Jr.

(57) ABSTRACT

A method and a system for routing data calls in which an incoming data call having a destination number is received. The data call is routed to a first destination over a circuit-switched telecommunications network based on the destination number for the data call. Transaction information is then sent to the first destination. Alternatively, the incoming data call is received at an input port. The incoming data call is associated with an automatic number identification and the input port is associated with an input port identification. The automatic number identification is stored in a database in association with the input port identification. A transfer message for the data call is received from the first destination. The transfer message contains information relating to an address for a second destination. The information relating to the address for the second destination is stored in the database in association with the automatic number identification and input port identification for the data call. The data call is disconnected from the first destination, and the data call is routed to the second destination over the circuit-switched telecommunications network.

22 Claims, 3 Drawing Sheets

METHOD AND SYSTEM FOR TRANSFERRING DIGITAL DATA CALLS BETWEEN DIFFERENT DESTINATIONS

BACKGROUND OF THE INVENTION

1. Field of the Invention

The present invention relates to the field of telecommunications. More particularly, the present invention relates to a method and a system for transferring digital data calls between different destinations.

2. Description of the Related Art

A basic "toll-free" 800 number call is a simple one-to-one transaction from a traditional POTS terminal, from which an 8YY (i.e., 800 or 888) number is dialed, to a traditional POTS destination telephone number having an associated reverse-billing capacity. Voice network services have evolved so that a toll-free 8YY call can be directed to different destinations based on, for example, a time of day, an originating NPA (Number Plan Area), basic information about a caller, a location of a calling party, additional digits collected from a calling party, availability and preferences of a called party, as well as such items as call forwarding options when a busy signal is obtained.

New forms of digital communications services that use digital technologies requiring end-to-end digital facilities have been introduced into the telephone networks, in contrast to the voice band (POTS) services that are required by voice calls. As a consequence, telephone service, specifically toll-free 8YY service, referred to herein as toll-free 800 service, has evolved so that data calls to a particular 800 number are routed to one destination providing end-to-end data communications services, while voice calls to the same toll-free 800 number are routed to another destination providing voice communications services. Data calls, as used herein, refer to digital communication services calls. Digital services send data calls on digital facility network lines, such as over 56/64 Kbps data lines, for transferring data for multimedia purposes, file and image transfer, slow scan video and numerous other data transfer requirements. Voice calls, as used herein, refer to all forms of voiceband services carried over a POTS network.

U.S. Pat. No. 5,533,108 to Harris et al., incorporated by reference herein, discloses an 800 multimedia system for routing phone calls to a common telephone number, such as a toll-free 800 telephone number, to a selected destination based on whether the call is a voice call or a data call. The Harris et al. system also has the capability of routing each data call based on a requested data rate and the handling capabilities required for completing and servicing the call. Consequently, a toll-free 800 number subscriber, such as a mail-order service, can use a single 800 number for providing both voice service capability and end-to-end data service capability for soliciting catalog orders. Voice calls are routed to a regular voice agent, while data calls are routed to a video agent for providing a caller with visual representations of products and other order information. A Direct Services Dialing (DSD) database is accessed in response to a voice call to the common number for providing an appropriate destination number for serving the voice call based on common call discriminators. A destination number for a data call, which may be different from the destination for a voice call, is also obtained from the DSD database based jointly on the common discriminators and a requested data rate discriminator. The destination number for a data call can vary based on the requested data rate discriminator so that data calls having different data rates are routed through appropriate data networks to a destination having the correct data rate capability.

For example, a hotel reservation system can provide both voice and data services at a single toll-free 800 number for making reservations and arrangements for other services provided by the hotel. In a conventional system, such as the system disclosed by Harris et al., a voice call can be extended from its initial destination so that a caller can be conveniently transferred, from the point of view of the caller, to another destination, such as to a car rental agency. An adjunct platform, referred to as a VP, that operates on a tandem toll switch, such as a 4ESS™ type switch, provides the capability of transferring a voice call that has been initially routed through the switch to another destination. When the VP adjunct receives a predetermined DTMF tone or sequence of DTMF tones from the first destination, followed by a 10-digit number for the next destination, the line to the initial destination is terminated and the call is transferred to the next destination. By transferring the voice call at the 4ESS™ switch, the line to the first destination is made available to another call to the destination.

Presently, data service has the capability of extending a call to a second destination, but there is not a way to transfer a data call to other destination. When a data call is extended to a second destination, the incoming line to the first destination used by the data call remains seized and the subscriber at the first destination pays for the call for the duration the call is extended. Additionally, as long as the line is seized, no additional calls can be completed to the subscriber on that line.

What is needed is a way to transfer a data call to another destination. Further, as Web-based applications evolve, the need for additional data bandwidth, such as ISDN speeds of switched 56, 64, 384 and 1536 Kbps, is increasing. Along with the need for additional bandwidth, a secure way to conduct electronic commerce on the Internet is also needed.

SUMMARY OF THE INVENTION

The present invention provides a way to transfer a data call to another destination. Further, the present invention provides additional data bandwidth and a secure way to conduct electronic commerce and financial transactions on the Internet.

The advantages of the present invention are provided by a method and a system for routing data calls in which an incoming data call having a destination number is received. The data call is routed to a first destination over a circuit-switched telecommunications network based on the destination number for the data call. Transaction information is then sent to the first destination. Alternatively, the incoming data call is received at an input port. The incoming data call is associated with an automatic number identification and the input port is associated with an input port identification. The automatic number identification is stored in a database in association with the input port identification. A transfer message for the data call is received from the first destination. The transfer message contains information relating to an address for a second destination and transaction identification information associated with the data call. The information relating to the address for the second destination is stored in the database in association with the automatic number identification and input port identification for the data call. The data call is disconnected from the first destination, and the data call is routed to the second destination over the circuit-switched telecommunications network.

BRIEF DESCRIPTION OF THE DRAWING

The present invention is illustrated by way of example and not limitation in the accompanying figures in which like reference numerals indicate similar elements and in which.

DETAILED DESCRIPTION

Figure 1:
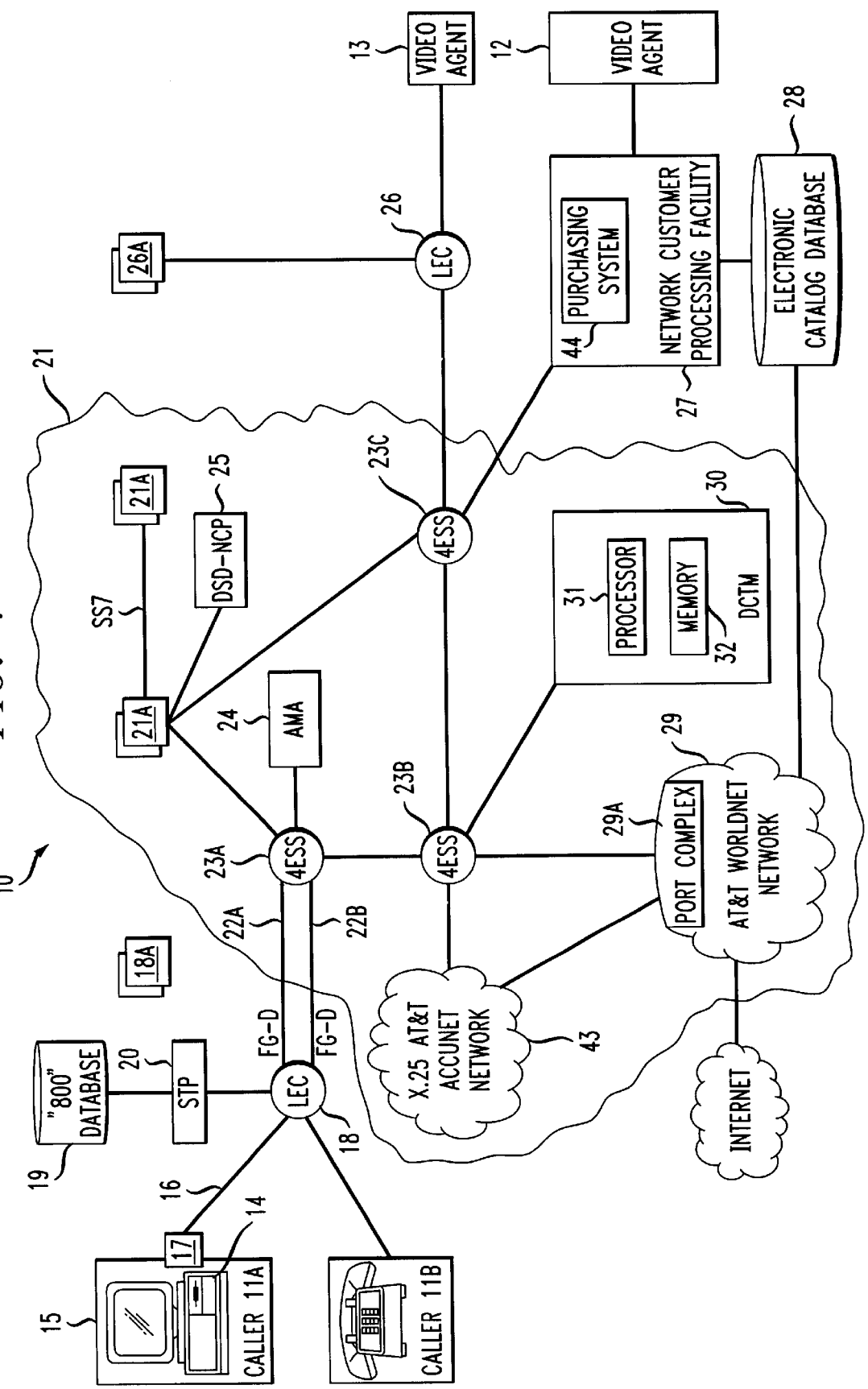
FIG. 1 shows a schematic block diagram of an exemplary embodiment of a telecommunications system providing an 800 toll-free multimedia service having an end-to-end data capability and direct access from an originating switch to a Direct Services Dialing database according to the present invention.

FIG. 1 shows a schematic block diagram of an exemplary embodiment of a telecommunications system 10 according to the present invention. System 10 provides an 800 toll-free multimedia service having an end-to-end data capability and direct access from an originating switch to a Direct Services Dialing (DSD) database. While the present invention will be described in terms of an 800 toll-free multimedia service, those skilled in the art will recognize that the present invention is applicable to "900", "700" and other similar call services that require intelligent call processing.

System 10 routes a phone call from a caller to a selected destination of a network subscriber based on voice and data transport capability. In FIG. 1, a toll-free network subscriber, such as a home shopping catalog service, has an electronic catalog database hosted on the Internet using, for example, AT&T WorldNet$^{SM}$ Services. The network subscriber also provides regular voice agents along with video agents that can both be accessed via the same 800 number. For example, one caller 11A may desire a data connection to a video agent 12, while another caller 11B may desire, via the same 800 number, a voice connection to a regular voice agent 13. In both cases, the communications between the caller and the agent are secure because each call is a point-to-point switched-connected call. There is no mechanism available for easily eavesdropping on a point-to-point switch-connected call and obtaining any financial transaction information, such as a credit card account number. This feature of the present invention is particularly true for telecommunications utilizing ISDN technology.

In FIG. 1, caller 11A uses a video terminal 14 that is located at the residence 15 of caller 11A. Video terminal 14 is connected to a data trunk phone line 16 through a standard data services connection device 17. When caller 11A dials the 800 number for the network subscriber, video terminal 14 generates a data call that requests a data rate of, for example, 384 kbps for an ISDN video call. Other data rates can also be requested. For example, the requested data rate can vary from 56 Kbps to 1536 Kbps and, in some instances, be greater.

There are a plurality of discriminators associated with an 800 toll-free call originating at residence 15 that are common to both voice and data calls. The discriminators include common decision variables that are a part of many toll-free 800 service calls and other similar services, such as an originating telephone number, a time of day, the nature of the caller (business or residence), additional information about the caller, as well as other variables such as availability and preferences of the called party, call forwarding routines, and other similar routines. A data rate discriminator corresponding to the requested data rate of the call is another discriminator used for a discriminator variable, as described by the U.S. Pat. No. 5,533,108 to Harris et al.

The call travels through data trunk phone line 16 extending from residence 15 to a Local Exchange Carrier (LEC) 18 in a well-known manner. LEC 18 receives the call associated with the common discriminators including the data rate discriminator. LEC 18 recognizes the call as an 800 toll-free number and queries an 800 toll-free database 19 in a well-known manner through a signal transfer point 20 for LEC 18. Information in database 19 identifies the call as belonging to a particular network carrier 21, such as AT&T. LEC 18 switches the call to the proper network carrier 21 using bearer capability routing in a well-known manner. If the 800 toll-free call is a voice call, LEC 18 routes the call to network carrier 21 on a Feature Group-D voice trunk 22A, which is also used for calls originating from a modem or other voice-band data type devices. For a digital services call, the call is routed to network carrier 21 on a Feature Group-D data trunk 22B. In some instances, all of the FG-D trunks between a LEC and a network carrier are considered to be data trunks because such trunks are all data trunk capable.

In the present example of an 800 toll-free data call, LEC 18 signals network carrier 21 with the type of connection indicated in the IAM message through a Signaling System 7 (SS-7) network interconnect 18A (for LEC 18) to an SS-7 network interface 21A (for network carrier 21) in a well-known manner. LEC 18 sends the call to an originating switch 23A in network carrier 21 with the caller's number identified by an Automatic Number Identification (ANI) code, plus the 800 toll-free number dialed by the caller, as well as the other discriminators. Originating switch 23A is also referred to as an Originating Screening Office/Action Control Point (OSO/ACP), and can be, for example, a 4ESS™ tandem toll switch. For data calls, the data discriminators can be sent in the Initial Address Message (IAM) over the SS-7 network, or may be implied from the digital capacity of the data trunks, as disclosed in U.S. Pat. No. 5,533,108 to Harris et al. The number identified by the ANI, which includes a billing number for the caller, is recorded by an Automatic Message Accounting (AMA) facility 24 that is connected to originating switch 23A so that subscribers to the 800 service provided by network carrier 21 can be billed accordingly.

Figure 2:
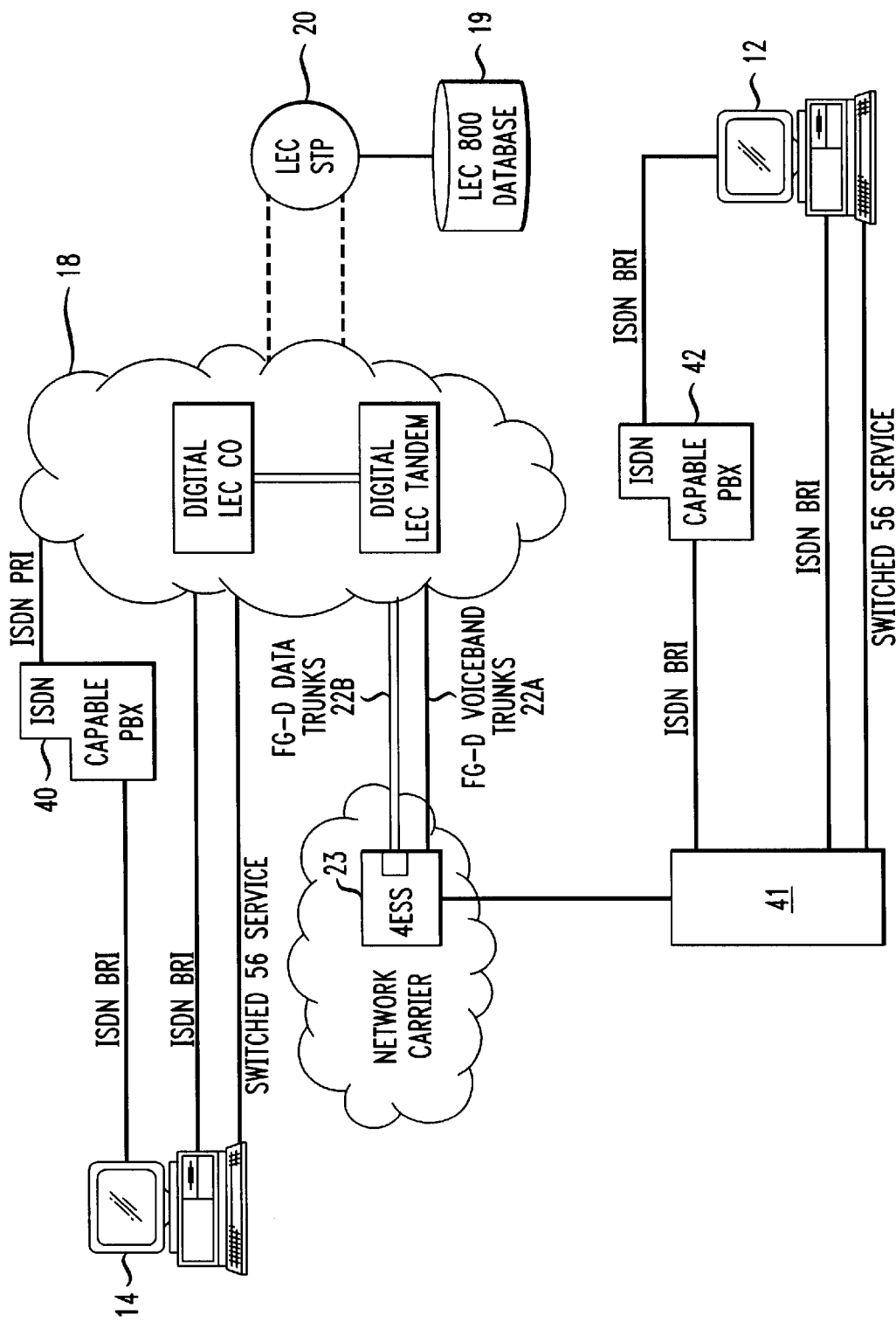
FIG. 2 is a schematic block diagram illustrating a call flow for an 800 toll-free multimedia call flow from an originating point, through a LEC, to an originating switch according to the present invention.

Alternatively, caller 11A can have a conventional ISDN basic rate interface (BRI), thus creating a pure digital connection, such as that shown in FIG. 2. FIG. 2 is a schematic block diagram illustrating a call flow for an 800 toll-free multimedia call flow from terminal 14, through LEC 18, to an originating switch 23A of network carrier 21 for a conventional ISDN BRI. Reference numerals used in FIG. 2 that are the same as used in FIG. 1 indicate similar elements in both Figures. The call setup message, which is standard for ISDN connections, includes some of the common discriminators, as well as the desired data rate as an additional discriminator. The Bearer Capability Information Element (BCIE), which is a mandatory part of each ISDN call set-up message, includes several information fields that, by themselves, do not unambiguously indicate the precise nature of a call being placed in conjunction with the message. Nevertheless, by evaluating several of the fields within each BCIE, as described in U.S. Pat. No. 5,533,108 to Harris et al., a call that is to be routed over a voice-band facility can be distinguished from a call requiring treatment as a data call, along with the rate required for the data call. In the case of data calls having relatively higher data rates, such as 384 Kbps, the information transfer rate field of the BCIE explicitly indicates the data rate.

An ISDN connection is typically used for a business setting where an ISDN capable Private Branch Exchange (PBX) 40 (FIG. 2) provides the essential peripheral equipment for using the ISDN standard. In a non-ISDN connection, LEC 18 receives the call over a "Switched 56" service and switches the data call to a Feature Group-D data trunk. If the Signaling System 7 Network Interconnect has not been deployed on the Feature Group-D data trunk, the dialed number and ANI information is delivered "in-band" using a portion of the capacity of the digital line. For calls arriving at OSO/ACP 23A on data trunks and for which network carrier 21 receives in-band signaling, OSO/ACP 23A may automatically imply that the call is a Switched 56 call request because the data rate discriminator is implied strictly from the capacity of the trunk. No voice calls are made or received on these particular trunks because they are dedicated for data calls only.

Returning to FIG. 1, in response to receiving a call placed to a common telephone number (e.g., an 800 toll-free number) that needs further translation for determining an appropriate destination number, originating switch 23A generates a query to a Direct Services Dialing-Network Control Point (DSD-NCP) database 25 over an A link for obtaining routing instructions the 8YY number dialed by caller 11A. For this example, the 8YY number has been provisioned to have both analog and digital transfer connect features. Alternatively, the query can be made first to an INWATS database (not shown) with a subsequent query to DSD-NCP 24. For a voice call, the translation is made to a voice (POTS) number, based on the common discriminators. The voice call is routed in a well-known manner, for example, through carrier network 21 and a LEC 26 and to the desired destination, that is, to voice agent 13. When LEC 26 utilizes SS-7 signaling, network carrier 21 signals the voice call through SS-7 network interface 21A (for network carrier 21) to SS-7 network interface 26A (for LEC 26).

A data call is routed to the appropriate destination number based on the common discriminators and the data rate capability of the original call. For example, a call having a requested data rate of 64 Kbps is routed to a destination number located at a network subscriber processing facility in, for example, Atlanta, while a call for a video terminal connection having a requested data rate of 384 Kbps is routed to a destination number located at a network subscriber processing facility in, for example, St. Louis. At each destination location, a video agent interacts with a caller for determining what purchases the caller desires to make. As shown in FIG. 2, the destination can be egress switched through a LEC 41 to an ISDN PBX 42 or other ISDN devices, or as a Switched 56 service. Although not shown in FIG. 2, the Feature Group-D (FG-D) trunking may be directly connected to an End Office without the need for a digital LEC tandem.

Consider the situation of a data call that is routed from caller 11A to video agent 12. Originating switch 23A routes the call through network 21 via switch 23C to a network customer processing facility 27 where video agent 12 is located. Video agent 12 is connected in a well-known manner to network 21 for receiving H.320-based video calls. Video agent 12 is also connected in a well-known manner to an electronic catalog database 28 that is hosted on the Internet using, for example, AT&T WorldNet$^{SM}$ services 29, so that when a caller is connected to video agent 12, the caller can browse the catalog database while interacting with video agent 12. In this example, caller 11A browses through a selection of video screens shopping for items that the subscriber customer offers for sale, while conversing with video agent 12, who appears in a live video window on the video display of terminal 14.

As caller 11A browses, items selected by caller 11A for purchase are placed in a virtual shopping cart. When caller 11A decides to buy the selected items, caller 11A completes the transaction by merely speaking credit card information over the voice channel of the data call connection as if caller 11A were talking to a regular voice agent. The line is circuit-switched and framed in a point-to-point H.320 protocol. By definition, the call is secure because there is no mechanism available for easily eavesdropping on a point-to-point switch-connected call and obtaining financial transaction information transmitted during the call. Details of this approach are set forth in U.S. Pat. No. 5,724,355 to Bruno et al., entitled Network Access To Internet And Stored Multimedia Services From A Terminal Supporting The H.320 Protocol, issued Mar. 3, 1998, and incorporated by reference herein. While this approach is secure, it is labor intensive in terms of the video agent's time and, consequently, is expensive.

An alternative technique provided by the present invention for conducting electronic commerce is for caller 11A to access the Internet to browse and shop. For this approach, caller 11A calls a toll-free number for accessing electronic catalog database 28, such as 888-644-0886, which is the access number for secure purchasing services provided by, for example, AT&T WorldNet$^{SM}$ services 29. The 8YY toll-free number dialed by caller 11A has been provisioned to have both analog and digital transfer connect features.

Originating toll switch 23A in FIG. 1 does not include a Digital Transfer Connect Manager (DTCM) platform. Consequently, when the call from caller 11A is received by switch 23A, switch 23A makes a query to DSD-NCP platform 24 for obtaining routing instructions the 8YY number dialed by caller 11A. In this case, network 21 routes the call to AT&T WorldNet$^{SM}$ services network 29 via switch 23B, which includes a DTCM platform 30. DTCM platform 30 includes a processor 31 and a memory 32. According to the present invention, for each 8YY toll-free data call traversing switch 23B, processor 31 generates a table entry in memory 32 that includes selected information about the data call.

Figure 3:
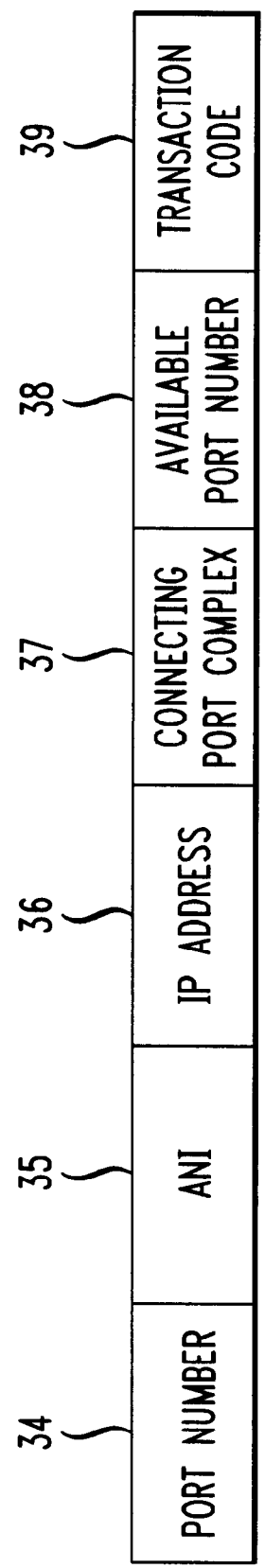
FIG. 3 shows an exemplary arrangement of a table entry generated by digital transfer connect manager for an 800 toll-free multimedia data call according to the present invention.

FIG. 3 shows an exemplary arrangement of a table entry 33 generated by DTCM platform 30 for an 800 toll-free data call. When the data call first enters switch 23B, DTCM 30 stores the port number on which the call enters switch 23B into a Port Number field 34, and the ANI for the incoming call into an ANI field 35. The Internet Protocol (IP) address received in response to the query to DSD-NCP 25 is entered into IP Address field 36. The call is routed to a Digital Transfer Connect (DTC) port complex 29A of, for example, the AT&T WorldNet$^{SM}$ IP Network 29, where electronic catalog database 28 is hosted. DTC port complex 29A is capable of terminating 56/64/384/1536 Kbps switched digital speeds. When the call is completed to the AT&T WorldNet$^{SM}$ Port Complex 29A, the connecting port complex number to which the data call is connected is entered into a Connecting Port Complex field 37 of table entry 33.

Caller 11A is connected to electronic catalog database 28 and begins browsing the database. Items that caller 11A wants to purchase are placed in, for example, a virtual shopping cart. When caller 11A is ready to purchase, a special purchasing ICON is selected. By selecting on the icon, a secure purchase request message is sent from terminal 14 to electronic catalog database 28. In response, a secure purchase application running on the electronic catalog database 28 sends a confirmation message of the secure purchase request to terminal 14 along with a transaction code and/or a synchronization code.

DTC port complex 29A is capable of monitoring an active port session for a DTC command sequence sent by electronic catalog database 28 in response to the secure buy request message. The DTC command sequence includes a start message, a start field, an end field, end message, and stop sequence. DTC port complex 29A also records the port assignment, trunk number, IP address and the ANI associated with the incoming call from caller 11A as a technique for subsequently verifying a particular caller with each transaction.

Upon receipt of the DTC command sequence, the DTC port complex 29A generates an Initiate Digital Transfer sequence, or issues the received DTC command sequence to DCTM 30, via the D channel of the ISDN PRI connecting the toll switch 23B to the DTC port complex 29A. Alternatively, an X.25 message can be issued to DTCM 30 connected to 4ESS™ switch 23B via an X.25 network 43, such as the AT&T ACCUNET® network.

Also in response to the secure purchase request, the secure purchase application running on the electronic catalog database 28 contacts a purchasing system 44 located at, for example, network customer processing facility 27, for obtaining a predetermined telephone number over which the transaction will be completed. The destination location of the predetermined telephone number for purchasing system 44 can be physically located anywhere, but for this example, the destination of the predetermined telephone number for purchasing system 44 located at customer processing facility 27. Database 28 also supplies purchasing system 44 with information relating to the contents of the virtual shopping cart and the transaction code. Purchasing system 44 returns a telephone number, such as 888-644-0886, to electronic catalog database 28, which, in turn, transfers the telephone number for purchasing system 44 to terminal 14. Alternatively, purchasing system 44 provides database 28 with the transaction code, which, in turn, is sent from database 28 to terminal 14. DTC port complex 29A records the telephone number information and passes it to DCTM platform 30 for processing.

DCTM platform 30 enters the predetermined phone number into an Available Port Number field 38 of table entry 33 for the call, and the transaction code is received from purchasing system 44 and recorded into a Transaction Code field 39 for the call. DCTM platform 30 disconnects the first call to AT&T WorldNet$^{SM}$ network 29. Preferably, DTC port complex 29A is provisioned to restore the port through which caller 11A was connected to database 28 to the AT&T WorldNet$^{SM}$ network inventory. If caller 11A transfers back to database 28, the call can be transferred through any port available in the AT&T WorldNet$^{SM}$ network 29. Alternatively, DTC port complex 29A can be provisioned to hold the line in reserve for caller 11A so that caller 11A might transfer back to the original session.

DCTM platform 30 accesses DSD-NCP 25 in a well-known manner over an A link and requests routing instructions for the 888-664-0886 number supplied by database 28. Circuit-switched network 21 establishes a point-to-point switched connection between DCTM 30 complex through toll switch 23B to the port that is associated with 888-644-0886. Alternatively, the predetermined telephone number obtained from purchasing system 44 is sent to terminal 14 which initiates a new call to purchasing system 44. In either case, when the call is received by purchasing system 44, the call is screened in a well-known manner for providing secure access to a computer system. The ANI for the call is passed from the egress 4ESS™ switch 23B over the D channel of the PRI line to purchasing system 44.

An application running on purchasing system 44 checks the ANI received with the call against a table of expected ANIs and computer ports. If the received ANI does not match any of the ANI entries in the table, the application sends a message to 4ESS™ switch 23B to reject the call and the caller receives a busy tone. If the ANI matches an entry in the table, the application signals 4ESS™ switch 23B to complete the call to the port. In this example, the call is now connected to purchasing system 44 and the application running on purchasing system 44 queries terminal 14 for the transaction code. The transaction code is verified against the transaction code received by purchasing system 44 from electronic catalog database 28.

If the transaction code received from terminal 14 matches a transaction code stored in purchasing system 44, purchasing system 44 sends a confirmation welcome message to terminal 14 and displays the contents of the virtual shopping cart. Preferably, purchasing system 44 runs an IP application that allows the browser running on terminal 14 to communicate with purchasing system 44 in the same manner terminal 14 communicates with the Internet. Caller 11A now verifies the contents of the virtual shopping cart, makes any additions and/or deletions, and can even browse a copy of the electronic catalog database on purchasing system 44.

Purchasing system 44 "pushes" a purchase screen to terminal 14 requesting caller 11A to enter credit card account information in appropriate fields. Once caller 11A has entered the requested information, the information is sent to purchasing system 44 using either a secure or an insecure technique. The information is transported on a point-to-point circuit-switched facility using a TCP/IP protocol for communications between terminal 14 and the purchasing computer application, not via a public Internet using connectionless technology. A circuit-switched call, by definition, is secure because there is no mechanism available for easily eavesdropping on a point-to-point switch-connected call and obtaining financial transaction information. By screening the ANI of all incoming calls and permitting only the calls that are pre-approved to terminate, the application running on purchasing system 44 does not require encryption for security. Nevertheless, encryption of financial transaction information can be used for providing an additional layer of security.

When the transaction is complete, caller 11A can hang up, thus terminating the call. Alternatively, caller 11A can request to be transferred back to electronic catalog database 28, or can be transferred by purchasing system 44 to yet another Internet-based destination or to another destination connected to circuit-switched network 21 in the manner described above.

Thus, the present invention provides Internet-type access to a video agent, while eliminating the fear associated in the public's mind with placing credit card information onto the Internet. While the example described above involves financial account information, the information exchanged between a caller and a video agent need not be financial account information. For example, the present invention can be used any type of data call that accesses a service-type organization, such as a mail-order business or a government agency, in which the caller is routed to another location for further processing. For example, an IP Multi-Media Call can be transferred to a customer service facility running on a separate computer system that is connected only to a circuit-switched telecommunications network. Transfer of calls from the is identical to the purchasing application is similar to that described in the example above. The application running at the customer service facility provides audio, video and data capabilities for a transaction, thus allowing secure electronic commerce for applications such as medical information, investment banking, stock transactions and other high security applications. Further, the present invention can be used with Frame Relay-type services, and for remote access to asynchronous transmission mode (ATM) type services.

While the present invention has been described in connection with the illustrated embodiments, it will be appreciated and understood that modifications may be made without departing from the true spirit and scope of the invention.

What is claimed is:

1. A method for routing data calls, comprising the steps of:
    receiving an incoming data call, the incoming data call having a destination number;
    connecting the data call to a first destination over a circuit-switched telecommunications network based on the destination number for the data call, said connecting including the routing of the call through a switch which includes a Digital Transfer Connect Manager (DTCM) platform, said DTCM platform monitoring the first destination for a transfer message during the data call;
    receiving a transfer message from the first destination for the data call, the transfer message containing information relating to an address for a second destination;
    disconnecting a portion of the data call between the first destination and the switch which includes the DTCM platform; and
    routing the call by establishing a connection between the switch which includes the DTCM platform and the second destination such that the rerouting of the call to the second destination occurs as part of the data call.

2. The method according to claim 1, wherein the step of receiving the incoming data call receives the data call at an input port, the incoming data call being associated with an automatic number identification and the input port being associated with an input port identification,
    the method further comprising the steps of:
        storing the automatic number identification in a database in association with the input port identification; and
        storing the information relating to the address for the second destination in the database in association with the automatic number identification and input port identification for the data call.

3. The method according to claim 2, wherein the transfer message further contains transaction identification information associated with the data call.

4. The method according to claim 3, further comprising the steps of:
    sending the transaction identification information to the second destination; and
    verifying the data call at the second destination based on the transaction identification information.

5. The method according to claim 4, further comprising the step of sending transaction information to the second destination.

6. The method according to claim 3, further comprising the step of sending the information relating to the address for a second destination and the transaction identification information to a caller initiating the data call.

7. The method according to claim 6, further comprising the step of generating another data call to the second destination after the step of disconnecting the data call from the first destination.

8. The method according to claim 7, further comprising the steps of:
    sending the transaction identification information to the second destination when the another data call is connected to the second destination; and
    verifying the data call at the second destination based on the transaction identification information.

9. The method according to claim 1, wherein the step of routing the data call to the first destination is based on a requested data rate associated with the data call.

10. The method according to claim 2, further comprising the steps of:
    receiving a transfer message from the second destination for the data call, the transfer message containing information relating to an address for a third destination;
    storing the information relating to the address for the third destination in the database in association with the automatic number identification and input port identification for the data call;
    disconnecting the data call from the second destination; and
    routing the data call to the third destination.

11. The method according to claim 10, wherein the first and third destinations are the same.

12. The method according to claim 10, wherein the first and third destinations are different destinations.

13. A system for routing data calls, comprising:
    a memory having a storage area storing information for an incoming data call, the information including an automatic number identification (ANI) associated with the incoming data call and an input port identification on which the data call is received; and
    a processor, coupled to the memory, connecting the data call to a first destination via a switch which includes a Digital Transfer Connect Manager (DTCM) platform, the DTCM platform monitoring the first destination for a transfer message during the data call;
    the processor disconnecting a portion of the first data call between the first destination and the switch which includes the DTCM platform and rerouting the data call by establishing a connection between the switch which includes the DTCM platform and a second destination in response to receiving a transfer message from the first destination for the data call, the transfer message containing information relating to an address for the second destination, the rerouting of the call to the second destination occurring as part of the incoming data call.

14. The system according to claim 13, wherein the processor routes the data call through a circuit-switched telecommunications network to the first destination.

15. The system according to claim 14, wherein the processor routes the data call through the circuit-switched telecommunications network to the second destination.

16. The system according to claim 13, wherein the transfer message further contains transaction identification information associated with the data call.

17. The system according to claim 16, wherein the processor sends the transaction identification information to the second destination.

18. The system according to claim 16, wherein the processor sends the information relating to the address for the second destination and the transaction identification information to a caller initiating the data call.

19. The system according to claim 13, wherein the processor routes the data call to the first destination based on a requested data rate associated with the data call.

20. The system according to claim 13, wherein when the processor receives a transfer message from the second destination containing information relating to an address for a third destination, the processor disconnects the data call from the second destination and routes the data call to the third destination.

21. The system according to claim 20, wherein the first and third destinations are the same.

22. The system according to claim 20, wherein the first and third destinations are different destinations.

* * * * *